United States Patent [19]
Foster

[11] Patent Number: 5,330,728
[45] Date of Patent: Jul. 19, 1994

[54] CATALYTIC CONVERTER WITH ANGLED INLET FACE

[75] Inventor: Michael R. Foster, Columbiaville, Mich.

[73] Assignee: General Motors Corporation, Detroit, Mich.

[21] Appl. No.: 73,024

[22] Filed: Jun. 7, 1993

Related U.S. Application Data

[63] Continuation-in-part of Ser. No. 976,309, Nov. 13, 1992, abandoned.

[51] Int. Cl.⁵ .................. B01D 50/00; B01D 53/34
[52] U.S. Cl. .................. 422/177; 55/DIG. 30; 422/180; 422/211; 422/222; 428/593; 428/604
[58] Field of Search ............ 422/177, 180, 211, 222; 55/497, 499, 511, 521, 523, DIG. 30; 428/593, 604; 502/439, 527, 87

[56] References Cited

U.S. PATENT DOCUMENTS

| | | | |
|---|---|---|---|
| 3,163,256 | 12/1964 | Lanning | 181/56 |
| 3,183,963 | 5/1965 | Mondt | 165/10 |
| 3,441,382 | 4/1969 | Keith et al. | 23/288 |
| 3,911,675 | 10/1975 | Mondt | 60/283 |
| 3,929,419 | 12/1975 | Chapman | 23/288 FB |
| 3,962,869 | 6/1976 | Wossner | 60/298 |
| 4,152,302 | 5/1979 | Nonnenmann et al. | 252/472 |
| 4,324,701 | 4/1982 | Honda et al. | 252/477 R |
| 4,382,323 | 5/1983 | Chapman et al. | 29/157 R |
| 4,559,205 | 12/1985 | Hood | 422/180 |
| 4,576,800 | 3/1986 | Retallick | 422/180 |
| 4,619,912 | 10/1986 | Jalbing et al. | 502/439 |
| 4,659,348 | 4/1987 | Mayer | 55/320 |
| 4,673,553 | 6/1987 | Retallick | 422/180 |
| 4,731,229 | 3/1988 | Sperandio | 422/188 |
| 4,814,146 | 3/1989 | Brand et al. | 422/179 |
| 4,849,185 | 7/1989 | Wittig | 422/171 |
| 4,942,020 | 7/1990 | Whittenberger et al. | 422/180 |
| 4,987,034 | 1/1991 | Hitachi et al. | 428/593 |

Primary Examiner—Robert J. Warden
Assistant Examiner—Krisanne M. Thornton
Attorney, Agent, or Firm—Karl F. Barr, Jr.

[57] ABSTRACT

A catalytic converter for use in the exhaust system of an internal combustion engine having a catalyst coated substrate with an inlet face oriented at an angle less than ninety degrees to the flow of exhaust gas entering the converter and fluid flow channels extending through the substrate from the inlet face to an outlet face and oriented at an angle less than ninety degrees to the inlet face. The mounting configuration within the canister allows for an increase in the frontal or inlet area without a corresponding increase in the converter cross section while the angled flow channels minimize the effect of the angled mounting of the substrate relative to the exhaust flow on the backpressure imposed on the exhaust system by the converter.

12 Claims, 3 Drawing Sheets

CATALYTIC CONVERTER WITH ANGLED INLET FACE

TECHNICAL FIELD

This is a continuation-in-part of Ser. No. 07/976,309 filed on Nov. 13, 1992 now abandoned.

The present invention is directed to a catalytic converter for use in the exhaust system of an internal combustion engine and, more particularly, to a catalytic converter having a space efficient, low restriction, slant bed configuration.

BACKGROUND OF THE INVENTION

Typical automotive vehicle exhaust systems, and an increasing number of non-automotive applications utilizing internal combustion engines, have catalytic converters disposed in the exhaust system for reducing the quantity of regulated exhaust constituents emitted therefrom. A common converter configuration utilizes a catalyst coated ceramic substrate packaged within a stainless steel canister. Openings on either side of the substrate conduct exhaust gas into, through, and out of the converter. The substrate is typically extruded and has catalyst coated passages through which the exhaust gas passes as it transits the converter.

An alternative to the ceramic substrate converter is the metal foil converter which utilizes a stack or coil of catalyst coated, corrugated metal foil sheets which are held together mechanically or by bonding to form a substrate. The metal foil substrate is mounted within a canister in a manner similar to the ceramic substrate. Placement of the sheets in a face-to-face orientation defines fluid flow passages between the sheets through which exhaust gas may flow.

Typical application of the catalytic converters heretofore described place the assembly in an under-body location where space considerations determine converter and, consequently, substrate size. In a common converter configuration described in Hood U.S. Pat. No. 4,559,205 issued Dec. 17, 1985 and assigned to the assignee of the present invention, the substrate is constructed such that the inlet and outlet faces are substantially perpendicular to the flow channels passing therethrough. The substrate is disposed within a canister such that the plume of incoming exhaust gas flows through the entrance cone with little expansion until it encounters the restriction to flow imposed by the inlet face at which point a portion of the flow passes directly through the substrate while the remainder of the flow is diverted to flow parallel to the inlet face of the substrate. The parallel flowing exhaust gas spreads over the face until it is turned again to flow through outer channels of the substrate. Each directional change imposed on the exhaust gas flow, as it transits the converter, adds to the restriction imposed on the system by the converter assembly.

In order to increase catalytic treatment area, it has been necessary to place multiple substrates in series in a single canister. Multiple bed designs, as such designs may be referred to, while increasing catalyst treatment area, have the drawback of increasing backpressure imposed on the exhaust system since the restriction imposed on the exhaust system by a converter is a function of the flow length and the inlet area of the substrate. Multiple bed designs increase the flow length while maintaining a constant inlet face area.

To reduce the backpressure imposed on the exhaust system by the converter, it may be desirable to increase substrate inlet face area (frontal area) while decreasing overall flow length and limiting increases in converter cross-section. In the case of converters having angled inlets, the entrance is at an angle to the substrate inlet face allowing for improved flow conditions as the gas approaches the substrate and an increase in frontal area with minimum effect on the converter cross section. Flow efficiency continues to suffer however due to the directional change experienced by the exhaust gas since the incoming flow must turn through the angle established by the flow channels, relative to exhaust flow direction, which extend perpendicular to the inlet face of the substrate.

SUMMARY OF THE INVENTION

In accordance with the present invention, a catalytic converter for use in the exhaust system of an internal combustion engine is disclosed. The converter has a catalyst coated substrate with an inlet face which is angled relative to the general direction of flow passages extending therethrough. The substrate may be viewed as having fluid flow passages which extend through the substrate at an angle which is not perpendicular to the inlet or frontal face. The angling of the flow passages relative to the inlet face allows the substrate to be mounted in a canister such that the inlet face and, consequently, the outlet or trailing face have a non-perpendicular orientation to the flow of exhaust gas. As the angle of the inlet face of the substrate approaches a parallel orientation relative to the direction of flow, of exhaust gas entering the canister, an inlet plenum having a runout which is substantially equivalent in length to the substrate inlet face may be used. Such a plenum allows for a low backpressure transition of the exhaust gas from the exhaust inlet to the substrate thereby reducing flow restrictions inherent in conventional converters having dramatic inlet angles and inlet faces which are normal to the gas flow. The angled flow passages further reduce restriction to flow by reducing the total directional change which the exhaust gas experiences as it transits the angularly mounted converter. A converter having a substantially parallel inlet face, relative to inlet flow, but with substrate flow passages which are normal to the inlet face can be expected to impose a directional change on the gas stream which exceeds 180°. The preferred embodiment of the low restriction converter disclosed herein having a frontal face which is substantially parallel to the incoming exhaust gas flow and having acutely angled flow passages, relative to the inlet face of the substrate, substantially straightens the flow of gas and minimizes the directional change imposed on the exhaust gas to less than 180° and, in a preferred embodiment, to values on the order of 90° or less.

The restriction to flow, imposed on an exhaust system by a catalytic converter is also a function of the flow length and the inlet or frontal area of the substrate. The non-perpendicular orientation of the substrate inlet face relative to the direction of exhaust flow through the converter, disclosed presently, allows the inlet face to be enlarged and the flow length to be reduced in a manner which increases the axial dimension of the converter without concomitant increases in height and width; an undesirable change in an underbody automotive environment. At the same time, the angled orientation of the flow passages through the substrate, relative to the inlet face, effectively reduces the directional change imposed on the gas flowing through the converter, minimizing restriction to exhaust flow. As such, converter effect on exhaust backpressure is minimized with little impact on vehicle packaging.

The present invention discloses a catalytic converter substrate having a slant bed configuration which, when mounted in a canister such that the frontal face is not perpendicular to the direction of exhaust flow, allows for a decrease in flow restriction over a substrate having flow passages normal to the frontal face.

Other objects and features of the invention will become apparent by reference to the following description and to the drawings.

DESCRIPTION OF THE PREFERRED EMBODIMENT

Figure 1:
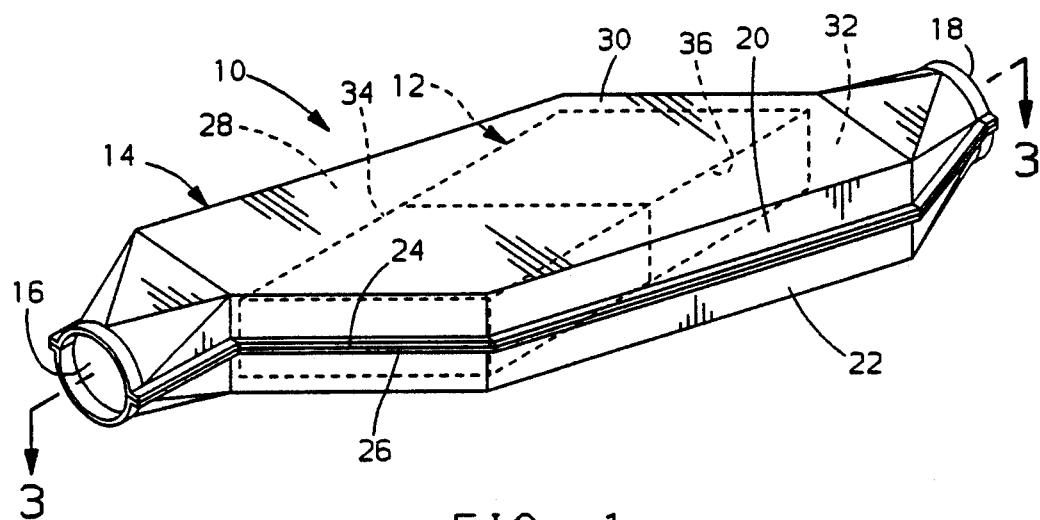
FIG. 1 is a perspective view, partially in section, of a catalytic converter embodying features of the present invention.

FIGS. 1–3 and 7 illustrate two embodiments of a catalytic converter designated generally as 10 for use in the exhaust system of an internal combustion engine. In the converter illustrated in FIGS. 1–3, the substrate is constructed to have a slanted box or oblique prism configuration while the converter of FIG. 7 has a substrate with a slanted oval shape. For descriptive purposes, like features are described below using like numerals. The converter comprises a catalyst coated substrate 12 mounted within a rigid canister 14 having an inlet 16 and an outlet 18. The canister 14 may be constructed of stamped stainless steel, or other material suitable for operation in a high temperature exhaust environment. In the embodiments shown, the "clamshell" type canister 14 is constructed of upper and lower portions 20, 22 which are stamped in a desired configuration and subsequently joined, during assembly along abutting flanges 24, 26 to define an inlet plenum 28, a substrate housing portion 30 and an outlet plenum 32. The clamshell method of construction is preferred in that it offers substantial flexibility in converter configuration.

Figure 2:
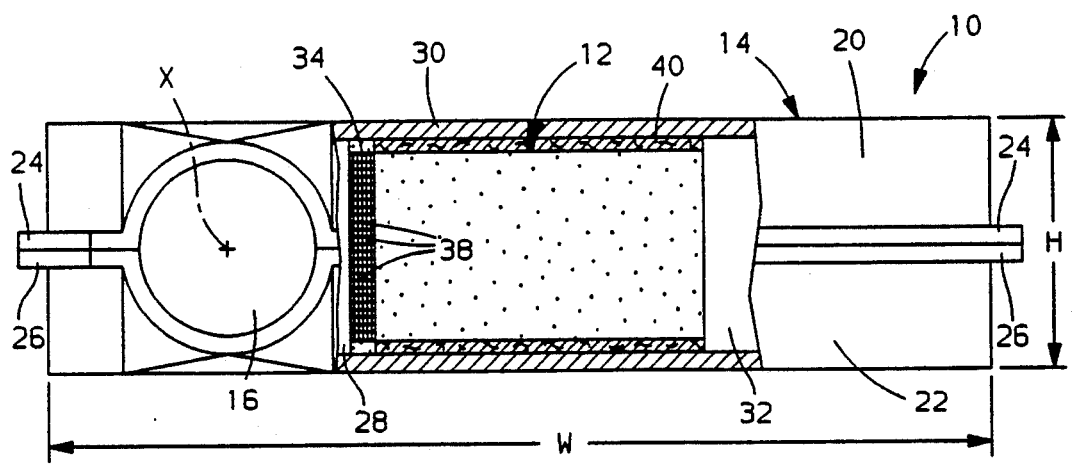
FIG. 2 is an end view, with parts broken away, of the catalytic converter of FIG. 1.

Mounted within the substrate housing portion 30 of the canister 14, catalyst coated substrate 12 is uniquely configured to minimize the exhaust system backpressure contributed by the converter 10. The substrate 12 is oriented such that the inlet and outlet faces 34 and 36, respectively, are positioned at an angle of less than ninety degrees (90°) to the plume of exhaust gas entering the converter through the inlet 16. In other words, the inlet 16 defines an axis "X" which approximates the direction of flow of exhaust gas entering the converter and the inlet face 34 is oriented at an angle which is less than ninety degrees to the flow direction. In the preferred embodiments shown, the inlet face 34 of the substrate 12 approaches a parallel orientation with the inlet flow direction "X". A principle advantage of the construction disclosed is that the dimensions of the inlet and outlet faces 34,36 of the substrate 12, a dimension that affects converter backpressure, may be increased as desired without a corresponding increase in the cross section of the converter represented by the end view of FIG. 2. In FIG. 2, the height (H) and Width (W) dimensions represent the cross section of the converter 10 which, in an automotive underbody environment, are often the most restrictive. In the present configuration the inlet face dimensions may be increased in the lengthwise direction indicated by "L" in FIG. 3 which, in an automotive application, may be viewed as the longitudinal or front to rear dimension. In most automotive, underbody applications the longitudinal dimension is the least restrictive and, as such, the increase in substrate and, consequently, converter length with a minimization in cross sectional increase is beneficial.

The substrate 12 is constructed such that the fluid flow passages 38 extending from the inlet face 34 to the outlet face 36 of the converter are not perpendicular to these faces but extend at an acute angle theta ($\theta$), less than ninety degrees thereto. Angling of the fluid flow passages relative to the inlet and outlet faces, benefits the flow efficiency when compared to a standard substrate in which the passages are oriented normal to the inlet and outlet faces of the substrate in that it substantially reduces the overall directional change which the exhaust gas is subjected to as it transits the converter 10 effectively straightening exhaust flow through the unit. The substrate 12 is supported within the canister 14 by the contours of the canister walls and, in addition, through the use of insulative material 40 disposed between the canister walls and the substrate. The insulative material 40 is operable to limit movement of the substrate 12 and to evenly distribute pressure along the outer surface thereof. Preferred insulative materials may consist of expandable ceramic/organic mats or stainless steel mesh, depending on the material selected for construction of the substrate.

In operation, the converter 10 is mounted within an associated exhaust system for an internal combustion engine (not shown) such that exhaust gas departing the engine is conducted into the converter through the inlet 16. Subsequent to entering converter canister 14, the exhaust gas is introduced into inlet plenum portion 28 in which it is evenly distributed along the inlet face 34 of the catalyst coated substrate 12. The extended plenum configuration facilitated by the use of the present substrate orientation minimizes the pressure drop as the flow is gradually reduced in cross sectional area along the length of the substrate with no sudden expansion of flow. In a standard converter having a substrate with an inlet face normal to the inlet exhaust flow, there is a flow expansion at the inlet cone which increases the resistance to exhaust flow and, consequently, system backpressure.

Exhaust entering canister 14 in the direction "X" flows substantially parallel along the inlet face 34 of substrate 12 where it is redirected through acute angle theta ($\theta$) into the catalyst coated flow passages 38 where a reduction in the content of regulated exhaust constituents is initiated prior to exiting the passages at the outlet face 36 and entering the outlet plenum portion 32 of the canister 14. As with the inlet plenum 28, the exit plenum 32 is preferably configured to efficiently direct the exhaust flow through the outlet 18 and into an associated exhaust conduit (not shown) for subsequent release to the atmosphere. In the embodiment disclosed, the outlet plenum mirrors the inlet plenum and the exhaust gas turns through an angle theta ($\theta$) to run substantially parallel to the outlet face 36 of substrate 12 as it exits the canister 14 through outlet 18. The angled flow passages 38 of the substrate 12 significantly reduce the overall directional change experienced by the gas, when compared to a standard substrate having flow normal to the inlet face, as it moves through the converter. The present invention minimizes the total directional changes imposed on the exhaust gas to less than 180° and, in a preferred embodiment, to values on the order of 90° or less.

Figure 3:
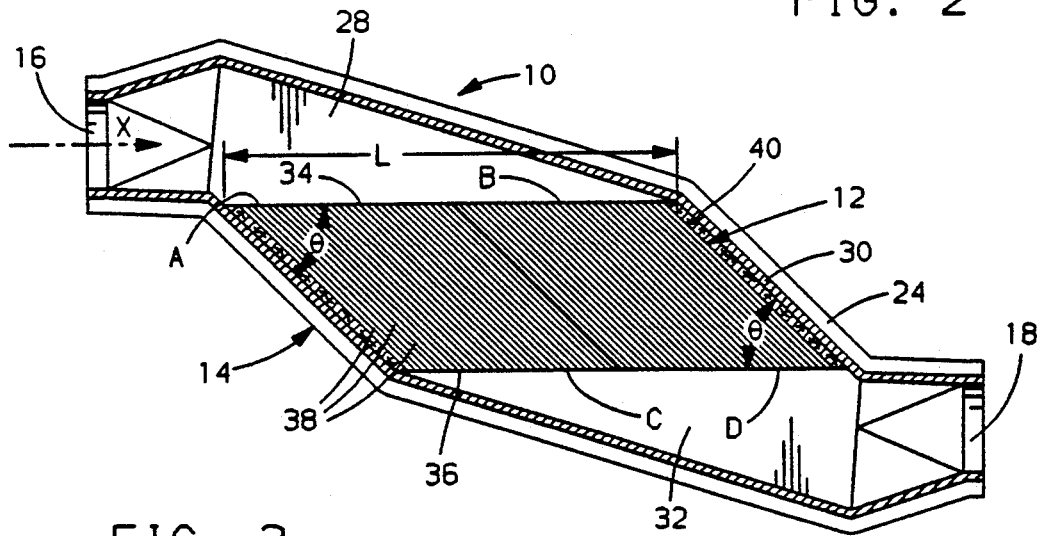
FIG. 3 is a sectional view of the catalytic converter of FIG. 1, taken along line 3—3.
Figure 4:
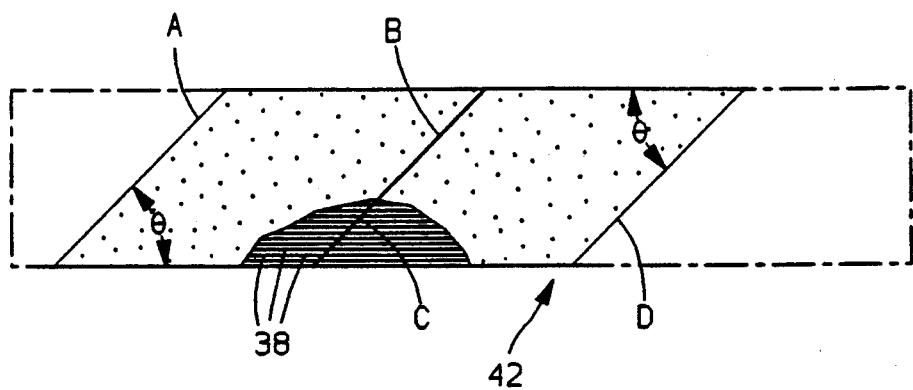
FIG. 4 is a schematic view of a ceramic substrate extrusion embodying features of the present invention.
Figure 5:
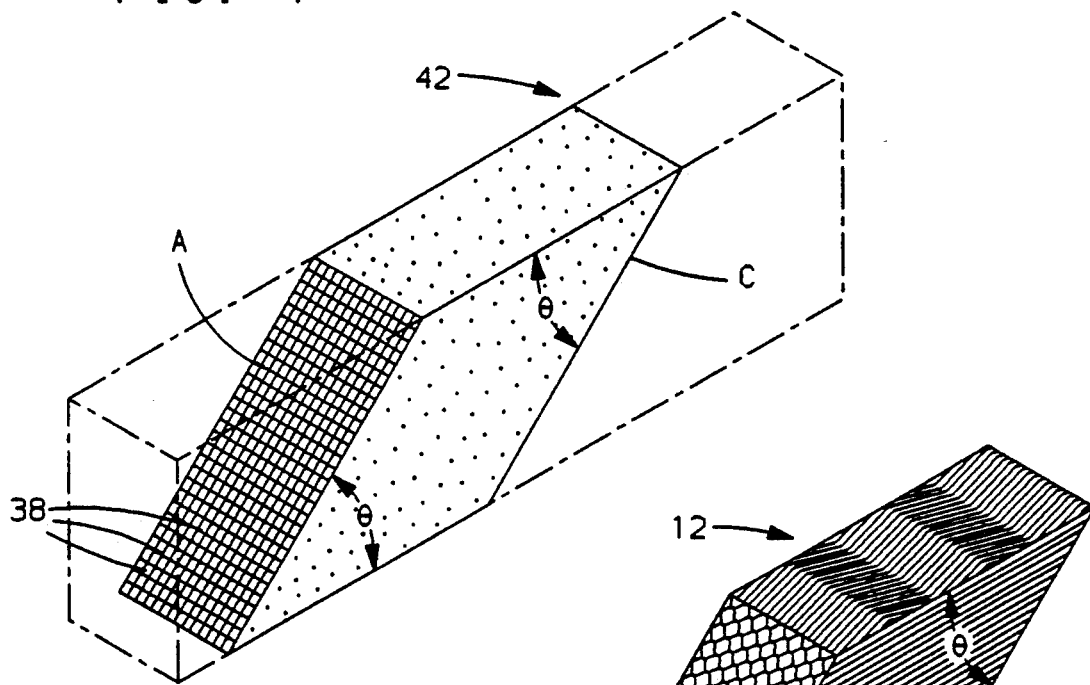
FIG. 5 is a perspective view of a first embodiment of a catalyst substrate of the present invention.
Figure 8:
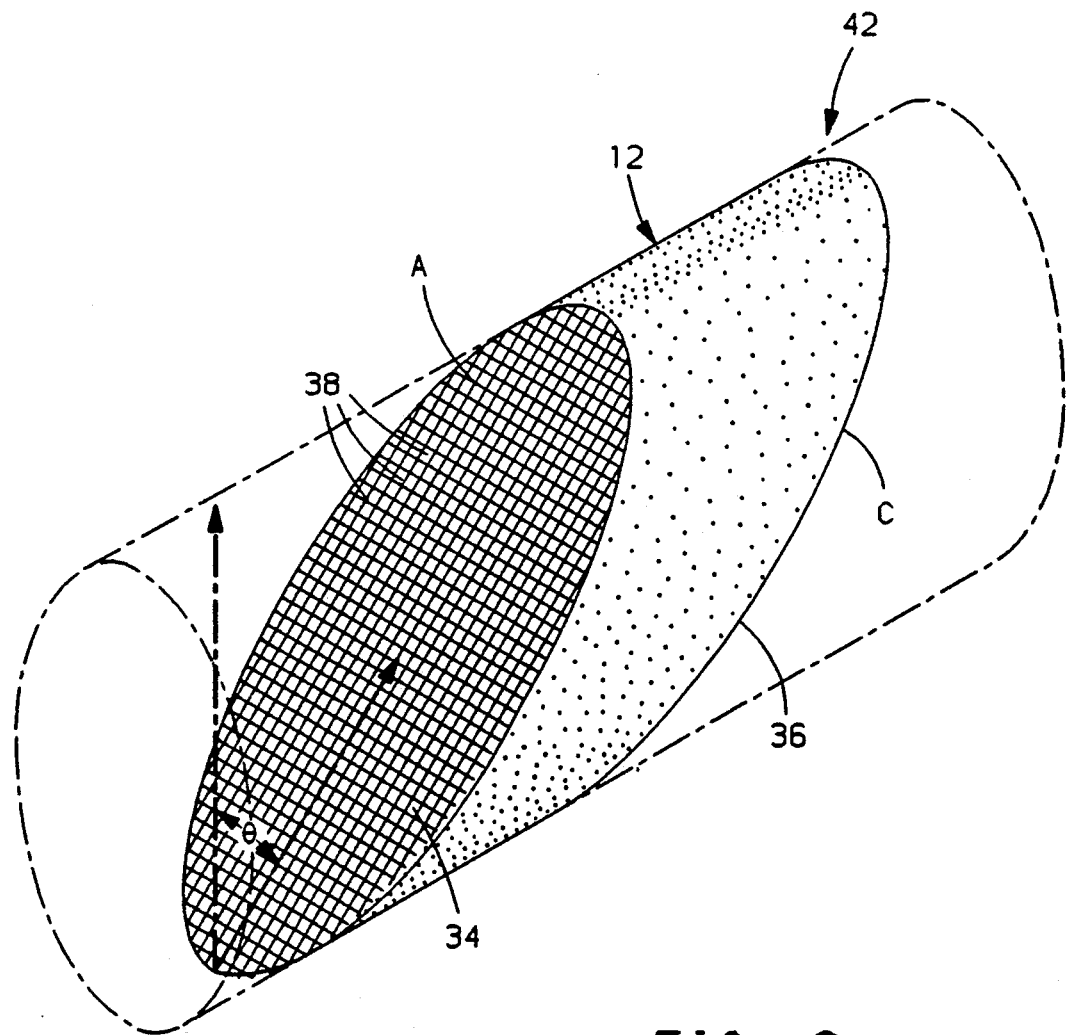
FIG. 8 is a perspective view of a third embodiment of a catalyst substrate of the present invention.

In a preferred embodiment of the catalytic converter of the present invention, substrate 12 is constructed of an extruded ceramic material. The actual composition of the ceramic may vary depending upon the particular application and coating to be used, however, a material such as corderite is contemplated. In typical applications of extruded ceramic monoliths, the material is extruded such that longitudinally extending flow passages are formed therein. The extrusion is cut, perpendicular to the longitudinal axes and the flow passages, resulting in a substrate of desired length. The present invention contemplates a similar ceramic extrusion 42, shown in FIGS. 4, 5 and 8, which is cut at an acute angle theta ($\theta$) to the longitudinal axis, or direction, of the extrusion. Such a cutting process results in the faces A,B and C,D which are oriented at an angle theta ($\theta$) to the fluid passages of the substrate. The angle at which extrusion 42 is cut to produce a substrate 12 will depend on the desired angle $\theta$. The mounting configuration of the substrate 12 within canister 14 affects the desired angle $\theta$. Installation of the diagonally cut ceramic substrate in the substrate housing portion 30 of the canister, either singly, as in FIG. 7, or in side by side relationship, as shown in FIGS. 1-3, results in exhaust gas passages 38, angled relative to the inlet and outlet faces 34,36.

Figure 6:
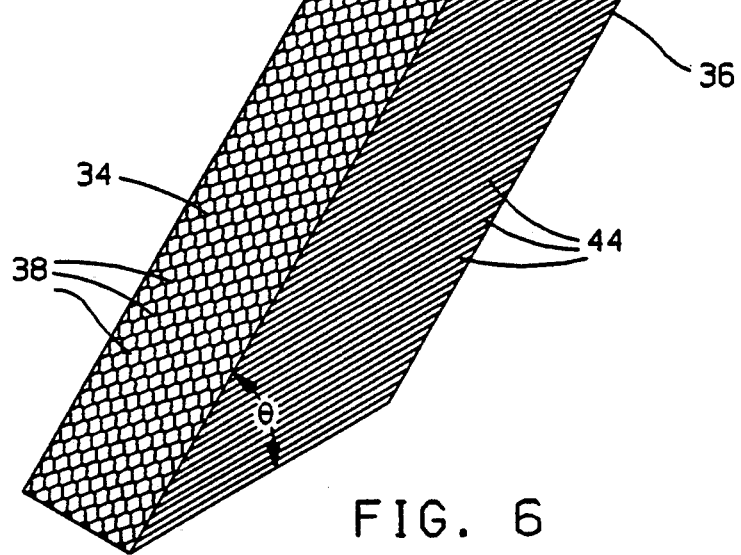
FIG. 6 is a perspective view of a second embodiment of a catalyst substrate of the present invention.
Figure 7:
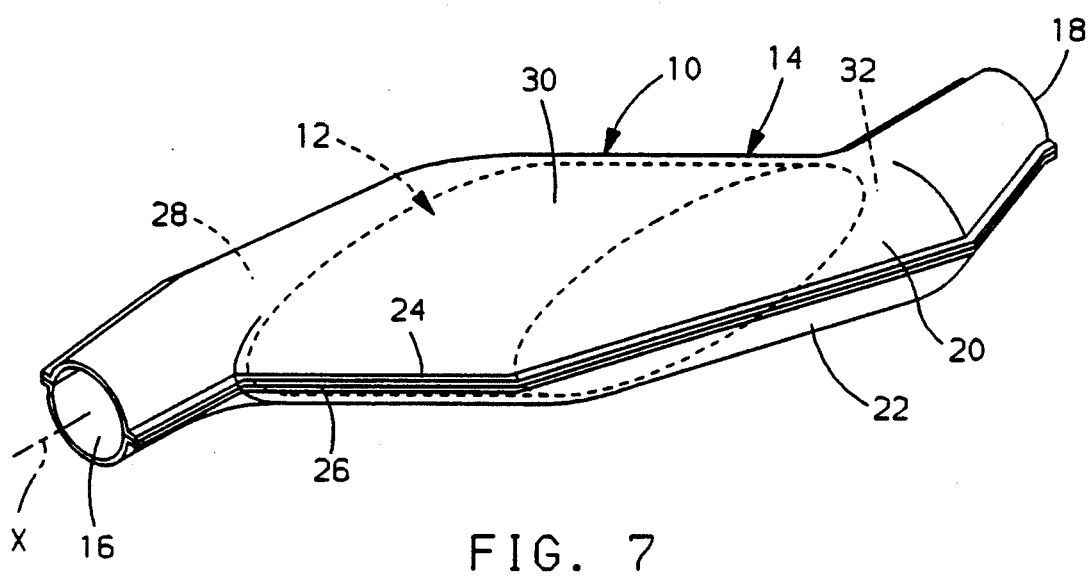
FIG. 7 is a perspective view of a catalytic converter, with the substrate shown in hidden line, embodying features of the present invention.

In a second preferred embodiment of the invention, the substrate 12 is constructed using corrugated metal foil sheets 44 as illustrated in FIG. 6. The sheets are of the type described in prior U.S. patents, as for example U.S. Pat. No. 3,183,963 and U.S. Pat. No. 4,619,912, such that it is not deemed necessary to describe them in detail here. The corrugations in the sheets 44 may be of any configuration which will avoid corrugation nesting so as to define fluid flow passages 38 between the sheets which extend from inlet face 34 to outlet face 36. In the foil substrate 12 the leading edges of the sheets 44 combine, when the sheets are stacked one upon the other, to define the inlet face 34. In similar fashion, the trailing edges of the sheets 44 define outlet face 36. Progressive offsetting of the leading and trailing edges of each sheet in the substrate 12 relative to adjacent sheets, yields a substrate having flow passages which extend at a desired angle theta ($\theta$) relative to the inlet and outlet faces 34,36. The desired substrate frontal area is achieved by stacking sheets in the longitudinal direction "L" as described above. The assembled sheets 44 are mechanically fixed with pins, clamps, or tabs or bonded to one another by brazing or welding at points of contact between the sheets thereby establishing a rigid, unitary catalyst support 12 which may be subsequently coated with a catalyst material and mounted within canister 14 as described above.

The catalytic converter configuration disclosed allows a larger catalyst substrate inlet or frontal area without an equivalent increase in converter cross section and minimizes directional disruption to exhaust gas flow through the converter. The angles at which the inlet face is mounted within the converter casing relative to the incoming exhaust gas, and at which the fluid flow passages of the substrate are oriented relative to the inlet face of the substrate, control the extent to which the inlet face area may be increased without effecting the cross sectional dimensions and the resistance to exhaust flow imposed on the exhaust system by the catalytic converter.

While a preferred embodiment of the catalytic converter has been disclosed in the above description, it should be apparent that numerous substrate canister configurations, inlet and outlet orientations, and substrate flow channel angles are contemplated, while remaining within the scope of the invention disclosed.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A catalytic converter comprising a rigid canister having an inlet, an outlet and a catalyst coated substrate disposed between said inlet and said outlet, said catalyst coated substrate having exhaust gas flow passages extending from an inlet face to an outlet face and oriented at an acute angle to said inlet face of said substrate and wherein said substrate is mounted within said canister such that said inlet face is substantially parallel to the direction of exhaust gas entering said converter through said inlet.

2. A catalytic converter as defined in claim 1, wherein said acute angle of said exhaust flow passages, relative to said inlet face operable to minimize directional change imposed on said exhaust gas to less than 180 degrees.

3. A catalytic converter as defined in claim 1, said catalyst coated substrate comprising a plurality of metal sheets stacked in face to face relationship and having corrugations thereon to define said exhaust gas flow passages between said sheets, each sheet having a leading edge which is progressively offset relative to each adjacent sheet to thereby angle said exhaust flow passages relative to said inlet face.

4. A catalytic converter as defined in claim 1, said catalyst coated substrate comprising an extruded ceramic substrate, wherein said inlet face is cut at said acute angle.

5. A catalytic converter as defined in claim 4, said catalyst coated substrate comprising a plurality of angled ceramic substrates placed in side-by-side adjacent relationship within said canister.

6. A catalytic converter comprising a rigid canister having an inlet plenum and a substrate housing portion with a catalyst coated substrate having exhaust gas flow passages extending from an inlet face to an outlet face disposed therein, said inlet plenum having an inlet opening into said plenum, said plenum extending the length of said substrate housing portion constructed and arranged to thereby distribute exhaust gas entering said plenum, through said inlet, over said inlet face of said substrate, said inlet face of said substrate having a substantially parallel orientation to said exhaust gas entering said plenum and wherein said exhaust gas flow passages are oriented at an acute angle to said inlet face of said catalyst substrate to minimize directional change imposed on said exhaust gas.

7. A catalytic converter as defined in claim 6, said acute angle of said exhaust flow passages, relative to said inlet face is operable to minimize the directional change imposed on said exhaust gas to less than 180 degrees.

8. A catalytic converter as defined in claim 6, said catalyst coated substrate comprising a plurality of metal sheets stacked in face to face relationship and having corrugations thereon to define said exhaust gas flow passages between said sheets, each sheet having a leading edge which is progressively offset relative to each adjacent sheet to thereby angle said exhaust flow passages relative to said inlet face.

9. A catalytic converter as defined in claim 6, said catalyst coated substrate comprising an extruded ceramic substrate, wherein said inlet face is cut at said acute angle.

10. A catalytic converter as defined in claim 9, said catalyst coated substrate comprising a plurality of angled ceramic substrates placed in side-by-side adjacent relationship within said canister.

11. A catalytic converter comprising a rigid canister having an inlet, an outlet and a catalyst coated substrate disposed between said inlet and said outlet, said catalyst coated substrate having exhaust gas flow passages extending from an inlet face to an outlet face and oriented at an acute angle to said inlet face of said substrate and wherein said substrate is mounted within said canister such that exhaust gas traversing said converter, from said inlet to said outlet, experiences a directional change of less than 180°.

12. A catalytic converter comprising a rigid canister having an inlet, an outlet and a catalyst coated substrate disposed between said inlet and said outlet, said catalyst coated substrate having exhaust gas flow passages extending from an inlet face to an outlet face and oriented at an acute angle to said inlet face of said substrate and wherein said substrate is mounted within said canister such that said inlet face is substantially parallel to the direction of exhaust gas entering said converter through said inlet, and exhaust gas traversing said converter, from said inlet to said outlet, experiences a directional change of less than 180°.

* * * * *